Patented July 22, 1947

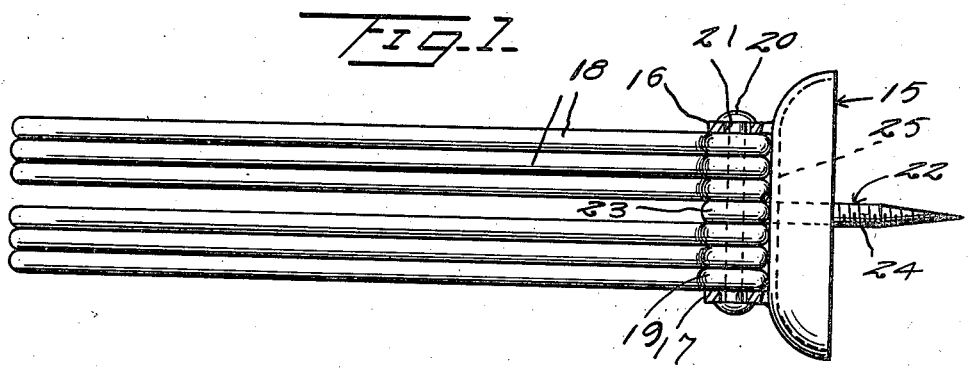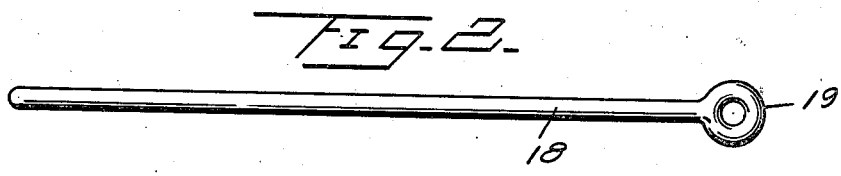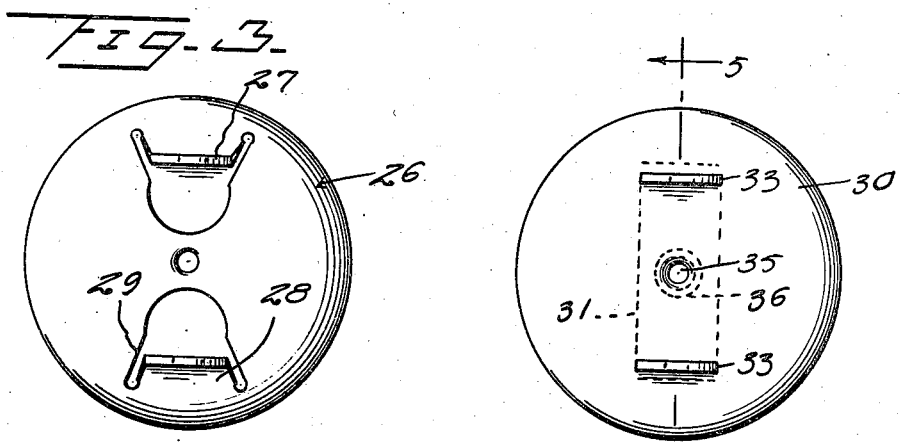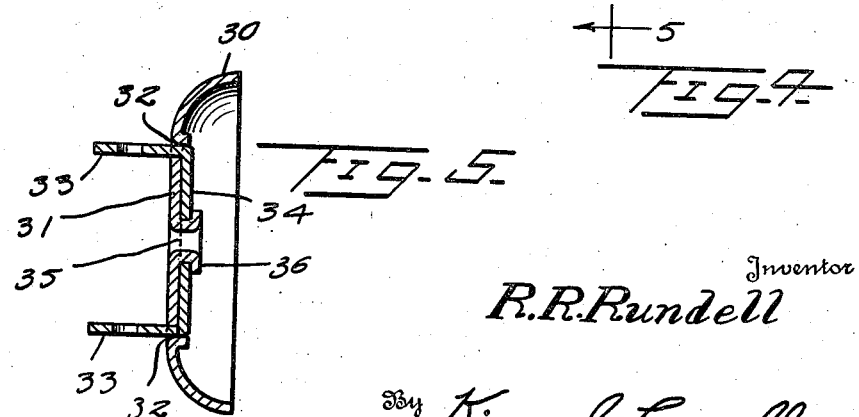

2,424,369

UNITED STATES PATENT OFFICE 2,424,369

SWINGING BRACKET

Raymond R. Rundell, Miami, Fla.

Application December 1, 1944, Serial No. 566,187

4 Claims. (Cl. 211—96)

This invention relates to swinging bracket construction.

An object of this invention is to provide a utility bracket which can be mounted on a wall or other support and which includes a base and a swinging article supporting member carried by the base.

Another object of this invention is to provide a bracket of this kind which has a base adapted to be formed out of stamped material and includes a swinging arm or a plurality of arms formed out of relatively heavy wire having an eye at its inner end with the pivot for the eye loosely engaging through the base in such a manner that the eye screw will frictionally hold the eye of the supporting arm in contact with the outer side of the base.

A further object of this invention is to provide a bracket of this kind which is so constructed that the base may be used for a plurality of supporting arms or rods to provide a clothes or door rack for supporting articles in spaced relation to each other.

With the foregoing objects in view, and others which may hereinafter more fully appear, the invention consists of the novel construction, combination and arrangements of parts as will be more specifically described, and illustrated in the accompanying drawings wherein are shown embodiments of this invention, but it is to be understood that changes, variations and modifications may be resorted to which fall within the scope of the invention as claimed.

In the drawings:

Figure 1 is a detail side elevation of a swinging bracket or support constructed according to an embodiment of this invention.

Figure 2 is a plan view of one of the supporting rods.

Figure 3 is a detail front elevation of a modified form of base structure.

Figure 4 is a detail front elevation of another form of base structure.

Figure 5 is a sectional view taken on the line 5—5 of Figure 4.

Referring to the drawings, and first to Figures 1 and 2, the numeral 15 designates generally a base member which is of substantially cup-shape and has extending therefrom a pair of ears 16 and 17. A plurality of article supporting rods 18 are swingably mounted between the ears 16 and 17, the rods 18 being formed with eyes 19 through which a pivot member 20 loosely engages.

The ears 16 and 17 are formed with openings 21 through which the pivot members 20 are adapted to engage, and preferably the openings 21 are slightly larger than the pivot member 20 so that the pivot member 20 may have slight lateral movement with respect to the two ears 15 and 17. A screw eye 22 has the eye 23 thereof engaged about the pivot member 20, and the shank 24 of the screw eye extends through the base plate 25 formed as part of the base member 15.

When the screw eye 22 is tightened so as to firmly hold the base member 15 against the wall or support, the eye 23 will move pivot member 20 inwardly toward the outer wall 25 of the base so that the eyes 19 of the rods 18 will frictionally engage the wall 25. In this manner the rods 18 can be frictionally held against free swinging movement.

In Figure 3 there is disclosed a modified form of this invention embodying a cup-shaped base member 26 which has struck outwardly therefrom a pair of ears 27. The ears 27 have formed integral therewith free yieldable extensions 28 which are formed by slitting, as at 29, the outer wall of the base 26.

In Figures 4 and 5 there is disclosed another form of base structure embodying a cup-shaped base 30, including an outer wall 31 which is formed with a pair of parallel slots 32. A pair of parallel ears 33 are extended through the slots 32 and are carried by a connecting bar 34 engaging on the inner side of base wall 31. The base wall 31 is formed with a central opening 35 through which the screw eye is adapted to engage and plate or bar 34 is firmly held by offsetting the base wall 31, as indicated, at 36.

What is claimed is:

1. A bracket comprising a pair of elongated article supporting members having an eye at one end thereof, a base, a pair of apertured lugs extending from said base, a pivot member loosely carried by said lugs and engaging through said eyes, and a screw eye having the eye thereof engaged about said pivot member and disposed between said first named eyes, the shank of said screw eye engaging loosely through said base and adapted to dispose the periphery of said first named eyes in frictional contact with said base to thereby frictionally hold said members against swinging movement.

2. A bracket comprising a pair of elongated article supporting members having an eye at one end thereof, a base, a pair of apertured lugs extending from said base, a connecting member engaging through said eyes and said lugs, and a screw eye carried by said base having the eye thereof disposed between said first named eyes and engaging about said connecting member.

3. A bracket comprising a pair of elongated article supporting members having an eye at one end thereof, a base, a pair of apertured ears extending from said base, yieldable means connecting said ears on said base, a connecting member engaging through said eyes and said ears, and a screw eye carried by said base having the eye thereof disposed between said first named eyes and engaging about said connecting member.

4. A bracket comprising a pair of elongated article supporting members having an eye at one end thereof, a base, said base formed with a pair of spaced apart slots therein, a pair of apertured ears extending from said base on one side thereof through said slots, a connecting bar interconnecting said ears on the other side of said base, means securing said connecting bar to said base, a connecting member engaging through said eyes and said ears, and a screw eye carried by said base having the eye thereof disposed between said first named eyes and engaging about said connecting member.

RAYMOND R. RUNDELL.

REFERENCES CITED

The following references are of record in the file of this patent:

UNITED STATES PATENTS

| Number | Name | Date |
| --- | --- | --- |
| 54,727 | Hotchkiss | May 15, 1866 |
| 204,713 | Castle | June 11, 1878 |
| 1,362,730 | Mull | Dec. 21, 1920 |
| 1,659,532 | Long | Feb. 14, 1928 |
| 1,762,628 | Hoyns | June 10, 1930 |
| 2,259,663 | Rosenthal | Oct. 21, 1941 |
| 2,230,037 | Hoeflich | Jan. 28, 1941 |
| 1,170,919 | McCallum | Feb. 8, 1916 |
| 1,674,342 | Priest | June 19, 1928 |

FOREIGN PATENTS

| Number | Country | Date |
| --- | --- | --- |
| 277,455 | Great Britain | Sept. 22, 1927 |